United States Patent
Mintz

(10) Patent No.: US 10,430,710 B2
(45) Date of Patent: Oct. 1, 2019

(54) CONNECTED HOTELS GUEST EXPERIENCE

(71) Applicant: Accenture Global Services Limited, Dublin (IE)

(72) Inventor: Renato Mintz, Belo Horizonte (BR)

(73) Assignee: Accenture Global Services Limited, Dublin (IE)

( * ) Notice: Subject to any disclaimer, the term of this patent is extended or adjusted under 35 U.S.C. 154(b) by 91 days.

(21) Appl. No.: 15/299,556

(22) Filed: Oct. 21, 2016

(65) Prior Publication Data

US 2017/0115018 A1     Apr. 27, 2017

Related U.S. Application Data

(60) Provisional application No. 62/245,589, filed on Oct. 23, 2015.

(51) Int. Cl.
| | | |
|---|---|---|
| *F24F 11/30* | (2018.01) | |
| *G06N 5/02* | (2006.01) | |
| *G05D 23/00* | (2006.01) | |
| *F24F 110/10* | (2018.01) | |
| *F24F 120/10* | (2018.01) | |

(52) U.S. Cl.
CPC .............. *G06N 5/022* (2013.01); *F24F 11/30* (2018.01); *F24F 2110/10* (2018.01); *F24F 2120/10* (2018.01)

(58) Field of Classification Search
CPC ...... G06N 5/022; F24F 11/30; F24F 2120/10; F24F 2110/10
See application file for complete search history.

(56) References Cited

U.S. PATENT DOCUMENTS

| | | |
|---|---|---|
| 5,538,181 A | 7/1996 | Simmons et al. |
| 5,682,949 A | 11/1997 | Ratcliffe et al. |
| 6,962,531 B2 | 11/2005 | Pace et al. |
| 8,452,630 B1 | 5/2013 | Fisher et al. |
| 8,788,308 B1 | 7/2014 | Cox et al. |
| 2003/0149576 A1* | 8/2003 | Sunyich ................. G06Q 10/02 705/5 |
| 2004/0083128 A1 | 4/2004 | Buckingham et al. |
| 2010/0243231 A1* | 9/2010 | Rosen ................ G05D 23/1904 165/237 |
| 2013/0073094 A1* | 3/2013 | Knapton ................ G05B 13/02 700/278 |
| 2014/0277762 A1* | 9/2014 | Drew ................... F24F 11/0086 700/276 |
| 2014/0358294 A1* | 12/2014 | Nichols .............. G05D 23/1919 700/278 |
| 2015/0017967 A1* | 1/2015 | Cao ......................... H04W 4/18 455/418 |

(Continued)

*Primary Examiner* — Brian W Wathen
*Assistant Examiner* — Brian T McMenemy
(74) *Attorney, Agent, or Firm* — Fish & Ricahrdson P.C.

(57) ABSTRACT

Methods, systems, and apparatus for providing an enhanced hotel guest experience. Disclosed methods include the actions of receiving data indicating the presence of a hotel guest from one or more sensors; generating a likelihood score that the hotel guest is going to their hotel room; determining that the generated likelihood score exceeds a likelihood threshold score; and based on determining that the generated likelihood score exceeds the likelihood threshold score, sending one or more instructions to one or more devices located within the hotel room.

20 Claims, 4 Drawing Sheets

(56) References Cited

U.S. PATENT DOCUMENTS

| | | | |
|---|---|---|---|
| 2015/0323943 A1* | 11/2015 | Chan | G05D 23/1951 |
| | | | 700/278 |
| 2015/0330652 A1* | 11/2015 | Kim | G05B 15/02 |
| | | | 700/276 |
| 2015/0348049 A1* | 12/2015 | Todasco | G06Q 10/02 |
| | | | 705/5 |
| 2016/0077532 A1* | 3/2016 | Lagerstedt | H04W 4/02 |
| | | | 700/277 |
| 2016/0313749 A1* | 10/2016 | Frenz | G05B 19/106 |

* cited by examiner

CONNECTED HOTELS GUEST EXPERIENCE

CROSS-REFERENCE TO RELATED APPLICATIONS

This application claims the benefit of U.S. Provisional Pat. App. No. 62/245,589, filed Oct. 23, 2015, which is incorporated by reference.

TECHNICAL FIELD

This document generally describes technology related to smart devices, such as sensors.

BACKGROUND

Smart sensors, such as smart door locks, can automatically detect the presence of an authorized device and unlock doors using a wireless protocol and cryptographic key to execute the authorization process. For example, a smart door lock may connect to an authorized device, such as a smart phone or key fob, through a Bluetooth connection. In other examples a smart door lock may connect to a home internet connection via Wi-Fi.

SUMMARY

This specification describes systems and methods for providing services to the guests in a hotel using a system of sensors located in and around the hotel.

Innovative aspects of the subject matter described in this specification may be embodied in methods that include the actions of receiving data indicating the presence of a hotel guest from one or more sensors; generating a likelihood score that the hotel guest is going to their hotel room; determining that the generated likelihood score exceeds a likelihood threshold score; and based on determining that the generated likelihood score exceeds the likelihood threshold score, sending one or more instructions to one or more devices located within the hotel room.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the one or more sensors are located in different areas of the hotel. In some aspects, receiving data indicating the presence of a hotel guest from one or more sensors comprises receiving data indicating a sequence of physical locations of the guest; and determining a path that the hotel guest is taking.

In some implementations, the device located within the hotel room is an in-room thermostat device. In other implementations, the device located within the hotel room is a lighting device. In further implementations, the instruction to the in-room thermostat device comprises an instruction to set the room temperature to a set point temperature. In further implementations, the in-room thermostat device is provided with a guest preferred temperature value. In some implementations, the set point temperature is the guest preferred temperature. In certain aspects, the presence of the hotel guest is detected in the hotel room of the hotel guest.

In some aspects, a first factor $F_{onp}$ and a second factor $F_{offp}$ are defined, where $F_{onp} < F_{offp}$ and $F_{onp}$, $F_{offp}$ are both less than or equal to one. In some implementations, the presence of the hotel guest is detected in the hotel facility. In further implementations, the set point temperature is set to GPT+((CET−GPT)*$F_{onp}$), where GPT represents a guest preferred temperature, CET represents a current external temperature and $F_{onp}$ represents a factor that is less than or equal to one. In some implementations, the presence of the hotel guest is not detected in the hotel facility. In further implementations, the set point temperature is GPT+((CET−GPT)*$F_{offp}$).

The subject matter described in this specification can be implemented in particular embodiments so as to realize one or more of the following advantages. The energy usage for heating and cooling spaces is a significant operational expense for many hotels. Even minor changes in temperature control procedures can result in significant energy savings. A dynamically controlled in-room thermostat device, as described in this specification, can optimize energy consumption while targeting the guest preferred temperature. This improves guest comfort and enhances their on-property experience. The connected hotel system, as described in this specification can provide a memorable, personalized on-property digital experience for hotel guests in an effective and efficient way. For example, the system may provide personalized recommendations for the hotel guest for a spa treatment based on the guest's interests and current location.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a system for creating a digital, connected hotel experience for hotel guests. Connected devices, including mobile devices, wearable devices, sensors, smart thermostats, smart lighting devices, alarm clocks, smart keyless door locks and entertainment devices provide a digital hotel hub that enables a connected hotel system to provide a memorable, personalized on-property digital experience for hotel guests in an effective and efficient way. Connected hotel guest mobile devices and hotel sensors enable a connected hotel system to track the location of hotel guests within the hotel facilities. The tracked location of hotel guests enables the connected hotel system to provide just-in-time, on-property, convenient and seamless experiences, such as personalized and optimized thermostat control, keyless hotel room entry, remote door unlocking, and food and beverage ordering. Connected hotel worker devices enable a connected hotel system to achieve greater efficiency in the management of a hotel workforce for servicing the connected hotel property and client requests. On-property digital experiences may be consistent and functional due to dynamic task scheduling and real-time communication between hotel workers and hotel guests.

Figure 1:
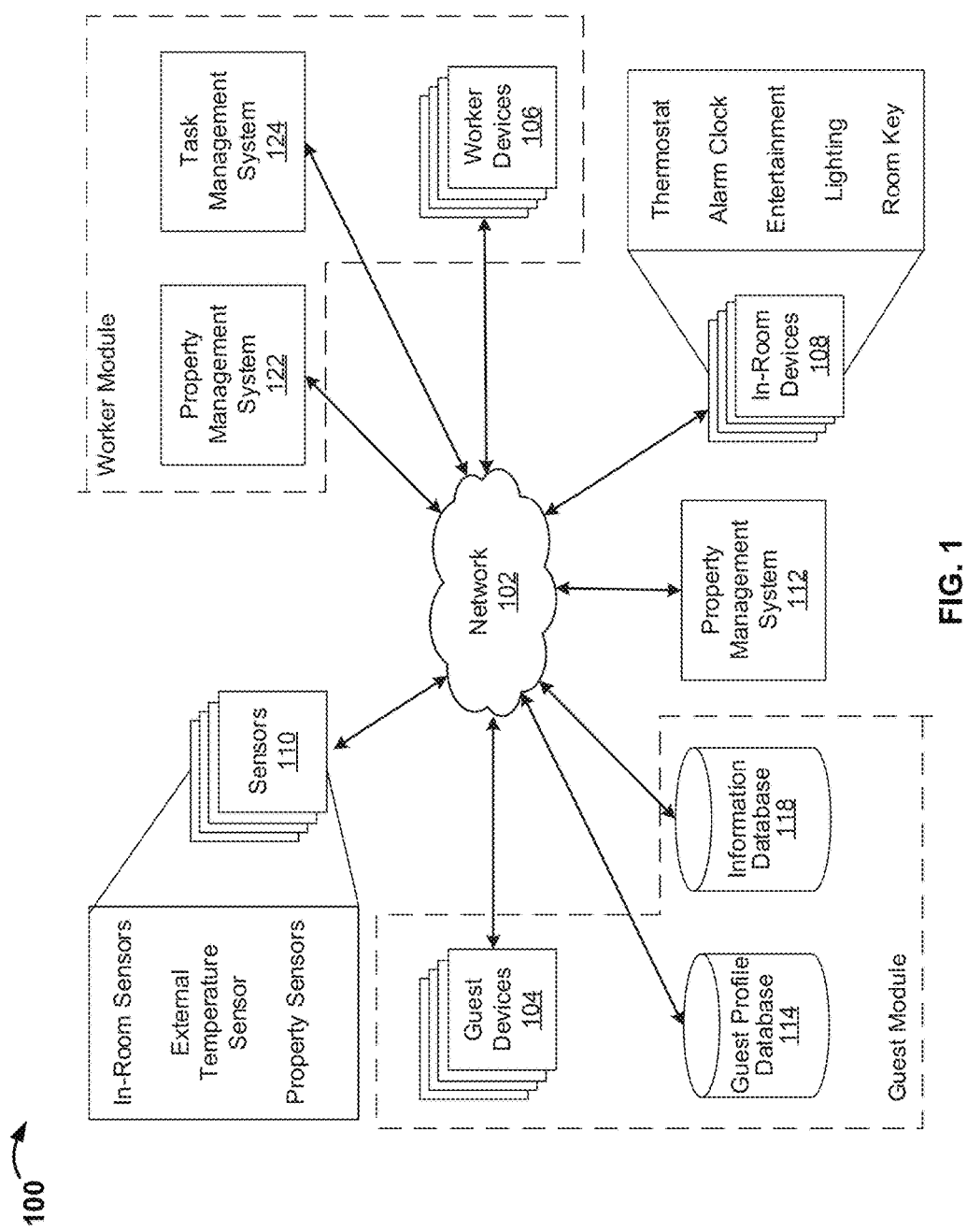
FIG. 1 depicts a block diagram of an example connected hotel system.

FIG. 1 depicts a block diagram of an example connected hotel system 100. The example connected hotel system 100 includes a network 102, e.g., a local area network (LAN), wide area network (WLAN), the Internet, or a combination thereof, guest devices 104, worker devices 106, in-room devices 108, sensors 110, property management system 112, guest profile database 114, information database 118, property management system 122 and task management system 124. The network 102 can be accessed over a wired and/or a wireless communications link. For example, mobile computing devices, such as smartphones can utilize a cellular network to access the network. It will be appreciated that the term "hotel" and the applicability of the invention extends beyond the preferred embodiment described. For example, the term "hotel" may include hotels, motels, inns, hostels, resorts, lodges, cruise ships and other commercial lodging facilities.

A guest device 104 is an electronic device that is under the control of a guest of the hotel and is capable of requesting and receiving information over the network 102. Example guest devices 104 include personal computers, mobile communication devices, e.g., smartphones and/or tablet computing devices, wearable devices and other devices that can send and receive data over the network 102. As used throughout this document the term mobile computing device ("mobile device") refers to a guest device that is configured to communicate over a mobile communications network. A smartphone, (i.e., a phone that is enabled to communicate over the Internet) is an example of a mobile device. A guest device 104 typically includes a user application, e.g., a web browser, to facilitate the sending and receiving of data over the network 102.

A worker device 106 is an electronic device that is under the control of an employee ("worker") of the hotel and is capable of requesting and receiving information over the network 102. Example worker devices 106 include personal computers, mobile communication devices, e.g., smartphones, smartwatches, and other wearable devices that can send and receive data over the network 102. As used throughout this document the term wearable computing device ("wearable device") refers to a worker device that is configured to communicate over a mobile communications network. A smartwatch, (i.e., a watch that is enabled to communicate over the Internet) is an example of a wearable device. Other examples include mobile devices that are fitted with a clip mechanism and can be attached to items of clothing. A worker device 106 typically includes a user application, e.g., a web browser, to facilitate the sending and receiving of data over the network 102. The worker device may be an Internet-of-Things (IoT) connected device.

An in-room device 108 is an electronic device that is located in a guest room of a hotel. Example in-room devices 108 include lighting devices, entertainment devices, smart thermostats, alarm clocks and smart (keyless) door locks. In-room devices are accessible from the guest devices 104 over the network 102. For example, lighting devices within a room of a hotel may be controlled using commands sent over the network 102 from an application installed on a guest mobile device. In another example, smart door locks for a room of a hotel may be controlled through communication between a guest mobile device and the smart door lock over the network 102, enabling keyless entry of the room. As used throughout this document the term connected in-room device ("connected device") refers to an in-room electronic device that is configured to communicate over a mobile communications network. The connected device may be an Internet-of-Things (IoT) connected device.

A sensor 110 is a device that detects events or changes in its environment and provides a corresponding output, e.g., using electronic signals. The sensors 110 are configured to communicate with other components of the connected hotel system, e.g., property management system 112, over the network 102.

One or more sensors 110 may be in-room sensors that are located in guest rooms. For example, in-room sensors may include movement sensors that are discretely positioned in a hotel room. Movement sensors may detect movement within the hotel room and provide as output an electronic signal indicating whether the room is occupied or not. The indication may be provided to the property management system 112 over the network 102 and processed accordingly. For example, if the movement sensor detects that the room is occupied, the property management system may receive an indication that the room is occupied and may notify the worker module and/or the worker devices 106 that the hotel room is not available for servicing. In other examples, in-room sensors may include beacons, e.g., Bluetooth beacons, or NFC devices which are discretely positioned in a hotel room. A beacon may broadcast its identifier to nearby mobile devices, e.g., guest devices 104 or worker devices 106, and enable the mobile devices to perform actions when in close proximity to a beacon. For example, a beacon may be used to determine a physical location of a mobile device or trigger a location-based action on a mobile device. The determined physical location of the mobile device may be provided to the property management system 112 over the network 102. For example, if the property management system 112 receives information that the guest mobile device is located in the guest hotel room, the property management system 112 may determine a likelihood that the guest is also located in the hotel room and notify the worker module and/or the worker devices 106 that the hotel room is not available for servicing. The in-room sensors may also include infrared sensors, sound sensors and door opening sensors.

One or more sensors 110 may be property sensors that are located throughout the hotel. For example, property sensors may include beacons, e.g., Bluetooth beacons, or NFC devices which are discretely positioned in various locations throughout the hotel. The property sensors may be used to determine a physical location and path taken by a mobile device, enabling tracking of mobile devices. For example, a sequence of beacons may be used to track the movement of a guest mobile device through a hotel. The sequence of beacons may provide a sequence of physical locations of the mobile device to the property management system 112 over the network 102. The property management system 112 may use the sequence of physical locations to determine one or more possible directions that the guest mobile device, and in turn the hotel guest, is going and to subsequently notify the worker module. For example, the property management system 112 may receive a sequence of physical locations of a guest mobile device measured by the in-room and property sensors that indicate that the guest has left their room, taken the elevator to the lobby and exited the hotel. Depending on other factors, such as time of day, or other recently tracked movements, the property management system 112 may determine that the hotel guest has left the hotel for the day and will not return in the immediate future. The property management system may therefore notify the worker module that the room is available for servicing.

In some implementations, the sensors 110 may include guest mobile devices 104. For example, guest mobile devices 104 may act as beacons that emit signals. The hotel may include one or more beacon detectors that are configured to detect beacon signals that the phones emit.

One or more sensors 110 may be an external temperature sensor that is located outside the hotel. The external temperature sensor may be used to determine an external temperature value, which may be provided to a thermostat in-room device 108 over the network 102. The external temperature value may be used to determine an energy-efficient default temperature setting for an unoccupied hotel room. Dynamical energy-efficient thermostat settings are described in more detail below with reference to FIGS. 2 and 3.

A property management system 112 communicates with the components of the connected hotel system 100 and includes one or more software applications that coordinate operational functions of the hotel. For example, the property management system 112 may automate hotel functions such as guest bookings, guest personal details, online reservations, point of sale, telephone, accounts receivable, sales and marketing, banquets, food and beverage costing, materials management, HR and payroll, maintenance management, quality management and other amenities. In addition, property management system 112 may include a central reservation system and revenue or yield management system, a front office, a back office, door-locking and keycard system, pay-TV system, energy management system, payment card authorization and channel management systems. In some implementations the property management system may be provided to the hotel by a third party provider.

The property management system 112 is configured to receive requests from guests of the hotel through a hotel application that may be stored on a mobile device 104 of the guest. For example, the property management system 112 may receive a request from a guest that their room be given "do not disturb" status, either automatically or by placing a do not disturb sign on the door. The property management system 112 may forward the request to the task management system 124 or directly to the worker devices 106.

The property management system 112 receives information from the sensors 110 relating to the physical location of hotel guests. For example, the property management system 112 may receive an indication from an in-room motion sensor that a guest is occupying the room. The property management system 112 may forward this indication to the worker module. In some implementations, the property management system 112 may receive an indication from a Bluetooth beacon that a guest mobile device 104 is located in the guest room. The property management system 112 may use this information to determine a likelihood that the guest is occupying the room, e.g., that the guest has not left their mobile device in the room unattended. In other implementations, the property management system 112 may receive a sequence of locations of a guest mobile device from one or more property sensors 110. The property management system 112 may use this information to determine a likely path the guest is taking, e.g., whether the guest is likely to exit the hotel, is heading to the hotel restaurant, or is returning to their room. The determined likely path may be provided to the worker module.

A guest profile database 114 stores data relating to the interest and preferences of hotel guests. For example, a hotel guest may install a hotel application on one or more guest mobile devices, and use the hotel application to create and maintain a guest profile that is stored in the guest profile database 114. The guest profile may include information relating to the hotel guest, such as personal details, e.g., name, age, contact information; dietary requirements, e.g., vegetarian, gluten-free; room preferences, e.g., room with bathtub, air-conditioning, king size bed; arrival and departure dates, and interest in various hotel facilities.

An information database 118 stores data relating to the hotel and surrounding area. For example, the information database 118 may include information relating to available facilities in the hotel such as spa facilities or childcare services, restaurant details including opening times and menus, and room service options. The information database 118 may also include information relating to the surrounding area in which the hotel is located, such as near-by sights to see, local attractions and events, local restaurants or places to eat and local transport links. Hotel guests may access information stored in the information database 118 using a hotel application installed on a guest mobile device 104. In some implementations, information provided to a hotel guest using the information database 118 may be personalized according to the interests and preferences of the hotel guest, as specified in the guest profile database 114.

For example, the property management system may receive a request from a hotel guest that they wish to stay an additional night in the hotel. The property management system may inform the task management system 124 that the hotel guest will stay an additional night. The task management system 124 may therefore edit the shift schedule to indicate that the corresponding hotel room does not require a full service. In some implementations this may involve reducing the amount of time the assigned worker needs to complete their assigned work for the day. In other implementations the change to the shift schedule may include a revision of the shift schedule and the service task may be assigned a higher or lower priority within the worker's schedule, or may be assigned to another worker.

The connected hotel system 100 may be used to deliver new or enhanced experiences to hotel guests as described below.

In some implementations, a guest of the hotel may use a mobile device 104 to update a hotel guest profile stored in the hotel guest profile database 114 prior to a planned stay at the hotel, e.g., two weeks prior to a planned stay. For example, a guest may have recently embarked upon a healthy lifestyle regime, and wish to update their hotel guest profile stored in the hotel guest profile database 114 to indicate an interest in using the hotel fitness facilities or to specify further dietary requirements such as low-fat or gluten-free. In another example, a guest may wish to update their hotel guest profile stored in the hotel guest profile database 114 to indicate that they would appreciate a hotel room with a double bed and a bath tub. As a further example, a guest may wish to update their hotel guest profile stored in the hotel guest profile database 114 to indicate an expected time of arrival, i.e., an expected check-in time. The updated hotel guest profile may be stored in the hotel guest profile database 114 and accessed by the property management system prior to the guest's planned stay. In some implementations the property management system may receive a notification that the hotel guest has updated their hotel guest profile.

In some implementations, the property management system 112 may access a hotel guest profile from the hotel guest profile database 114 prior to a guest's arrival and process the hotel guest profile in order to prepare for the guest's arrival. For example, the property management system 112 may process a hotel guest profile and determine that a guest has indicated an expected time of arrival and a preference for a hotel room with a double bed and a bath tub. Based on this information, the property management system 112 may prepare for the guest's arrival. For example, the property management system 112 may determine a list of rooms that will be available for use at the hotel guest's expected arrival time and that match some or all of the guest's indicated preferences. In some implementations the property management system 112 may use a hotel application installed on a guest device to provide the guest with a list of available rooms that best match their preferences for selection and reservation, prompted based on the guest's proximity to arrival.

In some implementations, the hotel guest may wish to prepare for their arrival at the hotel using a hotel application installed on a guest device. For example, as the guest makes their way to the hotel they may want to have food ready for consumption upon arrival. The guest may access the information database 118 to view the hotel food menus and place an order for room service using their mobile device. The property management system 112 may receive the request for room service and initiate preparation of the order accordingly.

In some implementations, the property management system 112 may access a hotel guest profile stored in the guest profile database 114 in order to generate one or more personalized recommendations for the hotel guest. For example, the property management system 112 may access a hotel guest profile and determine that the hotel guest has indicated an interest in using the hotel fitness facilities and specified dietary requirements such as low-fat or gluten-free. Based on this information, the property management system 112 may generate one or more personalized recommendations for the hotel guest, such as an invitation for a treatment at the spa or a suggestion to try a new gluten-free snack at the coffee shop. The personalized recommendations for the hotel guest can be provided to the guest through the hotel application installed on the guest's mobile device 104. In some implementations the property management system 112 may be configured to determine a location of the hotel guest within the hotel property, and provide the hotel guest with a personalized recommendation on their mobile device 104 at an appropriate time, such as when the hotel guest is walking towards the hotel spa or coffee shop. The personalized recommendations for the hotel guest can then also be provided to the guest through other methods, such as a graphical display located at the entrance to the spa or coffee shop.

In some implementations, the property management system 112 may access a hotel guest profile stored in the guest profile database 114 in order to determine a preferred room temperature of the hotel guest. For example, prior to the hotel guest's arrival, the property management system may determine a preferred room temperature of the hotel guest and program the in-room thermostat 108 accordingly. Dynamical thermostat settings that target a guest preferred temperature are described in more detail below with reference to FIGS. 2 and 3.

In some implementations, the in-room devices 108 may automatically determine a maintenance issue or failure and automatically report the issue or failure to the worker module. The worker module may provide the reported issue or failure to the task management system 124 and a maintenance ticket may be created. For example, a light bulb in a hotel guest room may go out and a maintenance ticket may be automatically created accordingly. In other examples, a hotel guest may use the hotel application installed on their mobile device to inform the property management system 112 of the failure. In either case, a notification may be provided to the hotel guest, e.g., through the hotel application installed on the guest mobile device 104, informing the hotel guest that a maintenance ticket has been created. The notification may be automatically provided to the hotel guest mobile device 104, or may be visible to the hotel guest upon logging in to the hotel application installed on the hotel guest mobile device 104. The notification may remain visible to the hotel guest until the issue has been resolved. In some implementations the hotel guest may be further provided with an automatic notification when the maintenance issue has been resolved, indicating that the maintenance issue has been closed.

In some implementations, a hotel guest may activate hotel services using the hotel application installed on their guest mobile device 104. For example, a hotel guest may be enjoying breakfast in the hotel restaurant and remember that he/she forgot to place a do not disturb sign on the door. The hotel guest can place a request to the property management system 112 using their mobile device 104 that the do not disturb status of their room is activated. The property management system 112 may provide the request to the worker module using the network 102, and the request may be provided to the task management system for scheduling. In addition, upon receiving the request, the property management system 112 may provide the request to the worker devices 106, thus informing the hotel workers that the hotel room is not available for servicing and should not be entered.

Continuing the example above, the hotel guest can also place a request to the property management system 112 using their mobile device 104 asking that the do not disturb status of their hotel room be deactivated and requesting that the room be serviced. The property management system 112 may provide the request to the worker module using the network 102, and the request may be provided to the task management system for scheduling. Dynamically altering a task schedule for connected hotel workers is described in more detail below with reference to FIG. 3. When the room service has been completed, a notification may be provided to the hotel guest indicating that the room service is complete.

In some implementations, sensors 110, e.g., in-room sensors or property sensors, may determine that a hotel guest has left the hotel room and initiate energy saving procedures accordingly. For example, upon determining that the hotel guest has left the hotel room, the in-room thermostat may automatically set the room temperature to a property default value. In other examples, upon determining that the hotel guest has left the hotel room, the in-room lighting device or in-room entertainment devices may automatically turn off. Dynamical thermostat settings that target a guest preferred temperature are described in more detail below with reference to FIGS. 2 and 3.

In some implementations, the hotel guest may use their guest mobile device 104 to access the information database 118. For example, the hotel guest may wish to investigate evening activities occurring at the hotel or in the local area, transport information for exploring the local area, or nearby places of interest. In some implementations the property management system 112 may access the guest profile database 114 to determine personalized activity recommendations for the hotel guest in the information database 118. For example, the hotel guest may indicate an interest in using the hotel fitness facilities in their hotel guest profile. Upon accessing the guest profile database 114, the property management system 112 may determine that the user is interested in sport and fitness and present the information available for the hotel guest to see in the information database 118 in a suitable manner, e.g., by displaying sport and fitness activities and centers located in or near the hotel in a prominent position for the hotel guest to view.

In some implementations, the hotel guest may wish to prepare for their departure using the hotel application installed on their guest mobile device 104. For example, the hotel guest may use the hotel application to view their folio and charges to prepare for checkout. In some implementations, the hotel guest's folio and charges may be stored and visible for review in the hotel guest profile stored in the guest profile database. In some implementations, upon departure the hotel guest may further use the hotel application installed on their guest mobile device 104 to indicate that they have checked out and that the room is empty and available for servicing.

In some implementations, the hotel guest may indicate that they would like to check-in early, e.g., through a hotel application installed on their mobile device or directly at the hotel reception. The property management system 112 can receive the request and provide the request to the task management system 124. The task management system 124 may process the request and immediately alter the schedule of a house keeper such that a hotel room may be prepared for the hotel guest as soon as possible. The house keeper may be notified of the alteration in their schedule through their worker device 106. Once the house keeper has prepared the hotel room for the hotel guest, they are able to directly notify the property management system that the hotel room is ready. In some implementations the property management system 112 may automatically inform the guest through the hotel application installed on the guest's mobile device that their room is ready. In other implementations the property management system 112 may inform the hotel reception that the room is ready, and a member of the ground floor staff may personally inform the hotel guest that their room is ready.

In some implementations, an in-room sensor may indicate that the hotel room is empty, and that the room is available for servicing. In another example, a sequence of property sensors, e.g., a sequence of sensors leading from the guest hotel room, down the elevator and to the lobby, may indicate that a hotel guest is leaving the hotel, or that a hotel guest is going for breakfast in the hotel restaurant. Upon receiving such information, the task management system 124 may alter the schedule of one or more housekeepers such that the hotel room is serviced immediately or very soon. If there is a house keeper working near the empty room with a relatively light schedule, the task management system may alter the house keeper's schedule to include servicing the empty room. In other implementations, in-room sensors included in the connected hotel system may include sensors that are able to provide data indicating the failure of an in-room device. The system provides the in-room sensor data to a task management system. As described above with reference to FIG. 1, the task management system manages and schedules daily tasks that are to be performed, for example by dynamically creating a shift schedule for each of the workers of the hotel. Based on the in-room sensor data, the system schedules hotel worker tasks.

In some implementations, the hotel guest may notify the property management system 112, either through the hotel application on their mobile device or directly at reception, that they do not want their room servicing, or that they would like a different type of service, such as a full service or simply to have the towels replaced. In such a situation, the property management system 112 may notify the housekeeper, either directly at their worker device, or indirectly at the task management system 124, that the needs of the hotel guest have changed. The housekeeper's schedule may be altered accordingly in order to meet the updated needs of the guest.

In some implementations, in order to increase a hotel guest's feeling of security, one or more hotel rooms may be installed with a dead bolt door lock. Instead of the dead bolt door lock being accessible to every hotel employee, or every hotel housekeeper in possession of a NFC access card programmed to gain entry to every room in the hotel, the dead bolt door lock may be dynamically unlocked for approved housekeepers at approved times. For example, a housekeeper may be assigned to service a hotel room with a dead bolt door lock at a scheduled time. At the scheduled time, the worker device in use by the housekeeper may send a request to the task management system that the dead bolt door lock be unlocked. The task management system may process the request in order to determine that the housekeeper is permitted to enter the room at the scheduled time.

Figure 2A:
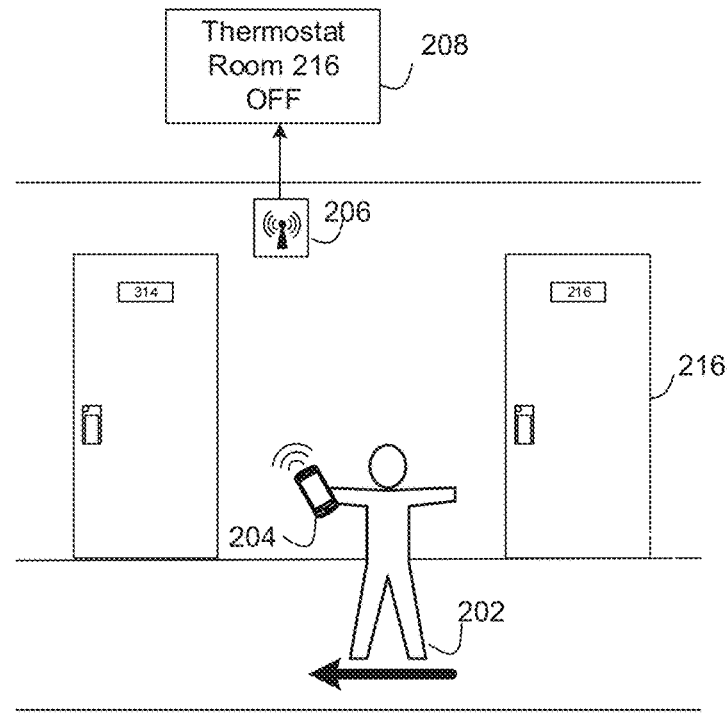
FIGS. 2A and 2B depict diagrams of dynamically controlling thermostat settings.

FIG. 2A depicts a diagram of an example setting for in-room device control. For example, as depicted in FIG. 2A, a hotel guest 202 may have left their hotel room, e.g., hotel room 216, and be walking in the direction of the elevator. The hotel guest may be carrying a mobile device 204, such as a smartphone, or a NFC room key. The presence of the mobile device or NFC room key may be detected by a sensor 206 that is located in the corridor of the hotel. Upon detecting the mobile device or NFC room key, the sensor 206 may send the detected location to a property management system of the hotel, e.g., property management system 112 of FIG. 1. As described above with reference to FIG. 1, the hotel may include several property sensors that are located throughout the hotel. The presence of the mobile device 204 or NFC room key may be detected by a sequence of sensors that are located throughout the hotel. Each sensor in the sequence of sensors may send their respective detected location to the property management system of the hotel.

In some implementations the property management system may use the detected locations to determine a likelihood that the hotel guest is vacating their room for a significant amount of time. For example, if the detected locations indicate that the hotel guest is going down in the elevator, the property management system may determine that it is likely that the hotel guest is vacating their room for a significant amount of time, e.g., they are leaving the hotel premises, heading towards the restaurant for a meal, or heading towards the hotel fitness facilities. As another example, if the detected locations indicate that the hotel guest is walking down the corridor towards an ice machine, the property management system may determine that it is unlikely that the hotel is vacating their room for a significant amount of time, and that rather they are simply collecting some ice before returning to their room.

Based on the determined likelihood, the property management system may program one or more in-room devices to switch on, switch off, or change their current settings, as shown in box 208. For example, as described above with reference to FIG. 1, a hotel guest may specify a preferred room temperature upon or prior to arrival at the hotel. A Heating, Ventilation and Air Conditioning (HVAC) in-room device may subsequently be programmed to maintain the guest's preferred temperature. However, if the property management system determines that it is highly likely that the hotel guest will vacate their room for a significant amount of time, the HVAC in-room device may be programmed to turn off, or to reduce or increase the temperature of the room.

The HVAC in-room device may be programmed to turn off, or to reduce or increase the temperature of the room based on several factors. For example, if the location of the hotel guest is tracked by a sequence of sensors, and it is determined that the guest is not leaving the hotel but is present somewhere in the hotel facilities, the HVAC in-room device may be programmed to a reduced energy setting that will not drastically change the temperature in the hotel room, since it may be assumed that the hotel guest may return to the their room soon, e.g., within one hour. If however the location of the hotel guest is tracked by a sequence of sensors and it is determined that the guest is leaving the hotel by automobile, the HVAC in-room device may be programmed to shut down entirely, as shown in FIG. 2A. Alternately, the HVAC in-room device may be programmed to a reduced energy setting that maintains the temperature in the hotel room at the current external temperature. In this case, it may be assumed that the hotel guest will not return to their room soon, e.g., within one hour.

Figure 2B:
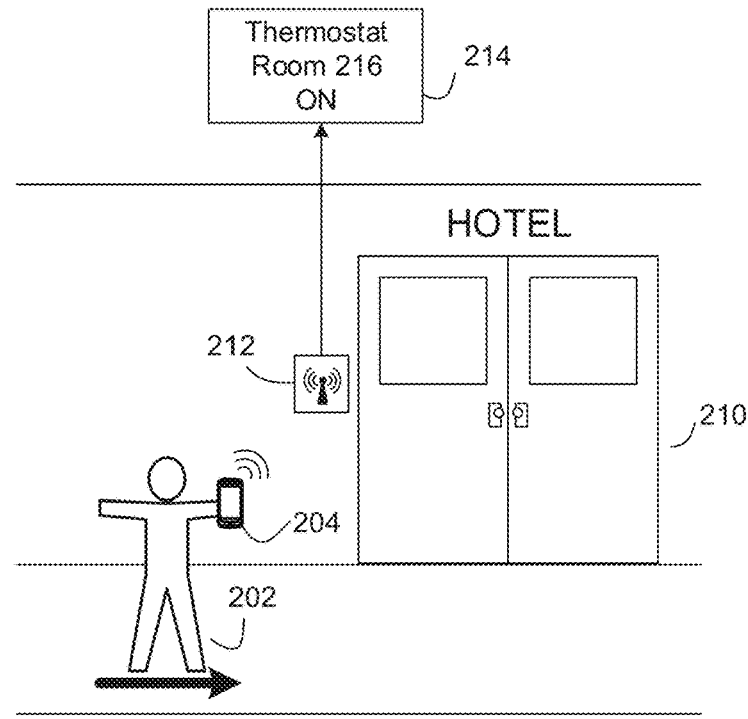

FIG. 2B depicts a diagram of an example setting for in-room device control. For example, as depicted in FIG. 2B, a hotel guest 202 may be returning to a hotel, e.g., at hotel entrance 210. The hotel guest may be carrying their mobile device 204 or NFC room key. The presence of the mobile device or NFC room key may be detected by a sensor 212 that is located at the entrance 210 of the hotel. Upon detecting the mobile device or NFC room key, the sensor 212 may send the detected location to a property management system of the hotel, e.g., property management system 112 of FIG. 1. As described above with reference to FIG. 1, the hotel may include several property sensors that are located throughout the hotel. The presence of the mobile device 204 or NFC room key may be detected by a sequence of sensors that are located throughout the hotel. Each sensor in the sequence of sensors may send their respective detected location to the property management system of the hotel.

In some implementations the property management system may use the detected locations to determine a likelihood that the hotel guest is returning to their room. For example, if the detected locations indicate that the hotel guest is arriving at the hotel after some time away from the hotel, the property management system may determine that it is likely that the hotel guest is returning to their room. As another example, if the detected locations indicate that the hotel guest has been dining in the restaurant for some time, and that the hotel guest is now waiting for an elevator, the property management system may determine that it is likely that the hotel guest is returning to their room.

In other implementations, the property management system may use other signals to determine whether the hotel guest is likely to return to their room. For example, if it is detected that the hotel guest is using a credit card to pay for a meal in the restaurant, or charging a spa treatment to their room number, the property management system may use the detected signals to determine a likelihood that the hotel guest will return to their room.

Based on the determined likelihood, the property management system may program one or more in-room devices to switch on, switch off, or change their current settings, as shown in box 214. For example, as described above with reference to FIG. 2A, the HVAC in-room device may have been programmed to turn off, or to reduce or increase the temperature of the room as the hotel guest left their room prior to leaving the hotel premises, visiting the restaurant or spa. If the property management system determines that it is likely that the hotel guest is returning to their room, the HVAC in-room device may be programmed to turn on or change the temperature settings to the guest's preferred temperature. For example, if the hotel guest prefers a cool hotel room, upon returning to the hotel and waiting for an elevator to their hotel room floor, the HVAC in-room device may be programmed to turn on the air-conditioning. In another example, if the hotel guest's preferred temperature is warm, upon paying for a spa treatment and leaving the hotel fitness facilities the HVAC in-room device may be programmed to turn on the heating.

Figure 3:
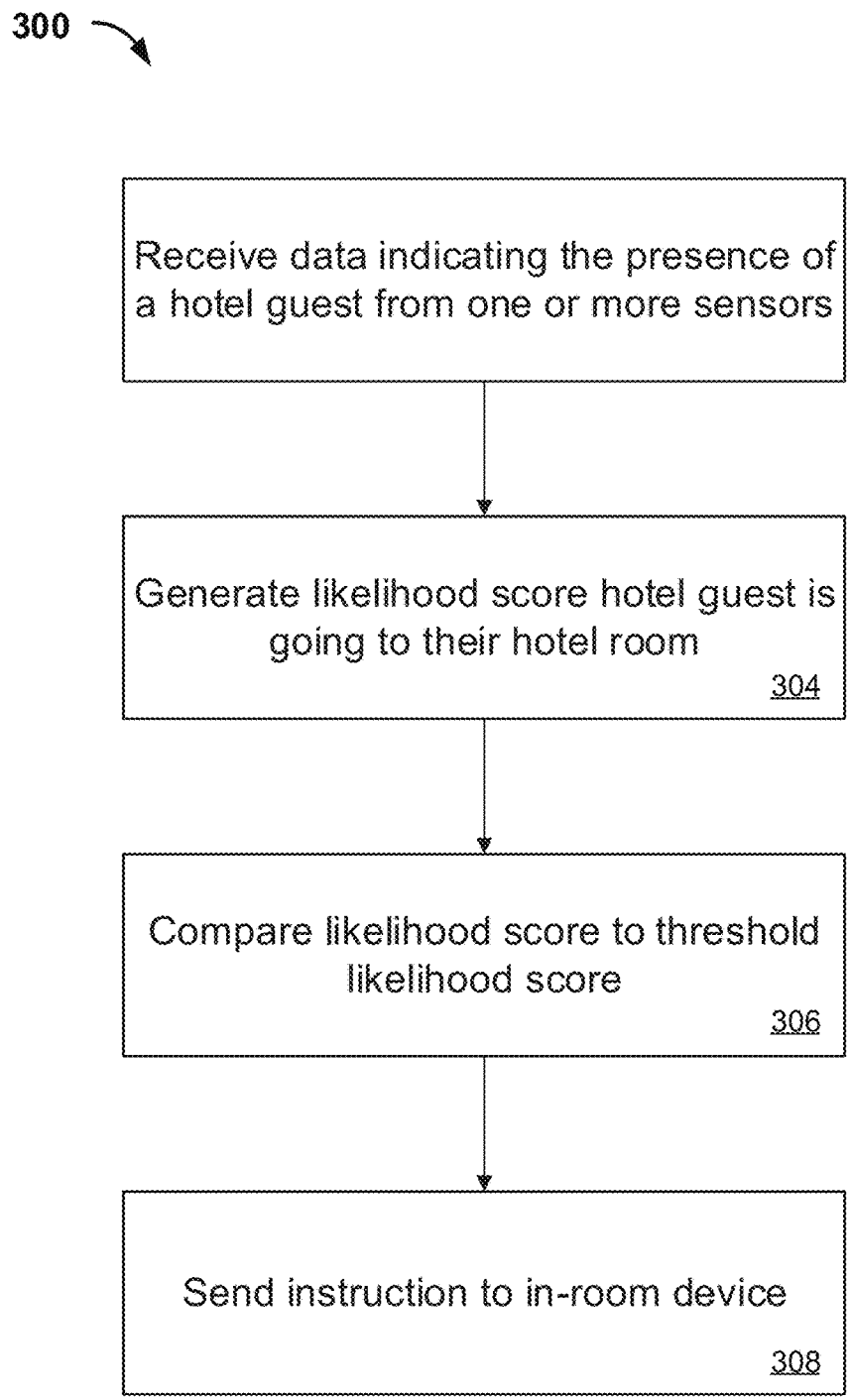
FIG. 3 depicts a flowchart of an example process for dynamically controlling thermostat settings.

FIG. 3 depicts a flowchart of an example process 300 for dynamically controlling thermostat settings. The process 300 can be implemented, for example, by the connected hotel system 100 of FIG. 1 above.

The system detects the presence of a hotel guest in the hotel facilities (step 302). For example, the presence of the hotel guest in the hotel facilities may be detected using location technology, such as the sensors 110, guest devices 104 and property management system 112 described above with reference to FIG. 1. The presence of the hotel guest may be detected in the hotel guest's room using in-room location technology, or may be detected in the hotel facilities, e.g., at the hotel bar, fitness facilities or restaurant, using property location technology, e.g., sensors distributed throughout the hotel.

The system generates a likelihood score that the hotel guest is returning to their hotel room (step 304). For example, the system may detect the presence of the hotel guest in the hotel facilities, such as the hotel restaurant. As described above with reference to FIGS. 1 and 2, the system may detect a sequence of locations of the hotel guest in the hotel facilities using property location technology. The system may generate a likelihood that the hotel guest is returning to their hotel room by analyzing the recent movements of the hotel guest. For example, the system may determine that the guest has recently left their room and taken the elevator to the ground floor and walked into the hotel restaurant. By tracking the hotel guest in this way, the system may determine a low likelihood that that hotel guest is returning to their hotel room, since it is more likely that the hotel guest wishes to eat something. In another example, the system may determine that the hotel guest entered the hotel fitness facilities over one hour ago, and is now waiting for an elevator to take him/her to the floor where their hotel room is located. By tracking the hotel guest in this way, the system may determine a high likelihood that the hotel guest is returning to their hotel room. Other factors, such as hotel guest behavior and preferences, e.g., as stored in a hotel guest profile such as guest profile database 114 of FIG. 1, time and date or recent activities or movements within the hotel facilities may be taken into consideration when generating a likelihood that the hotel guest is returning to their hotel room.

The system compares the generated likelihood score that the hotel guest is returning to their hotel room to a threshold likelihood score (step 306).

Based on comparing the generated likelihood score that the hotel guest is returning to their hotel room to a threshold likelihood score, the system sends an instruction to an in-room device (step 308). For example the system may determine a likelihood that the hotel guest is returning to their hotel room that exceeds the threshold score of step 306. The system may therefore assume that the hotel guest is returning to their hotel room, and send instructions to an in-room device. The in-room device may be an in-room thermostat. For example, the instructions may include a temperature value for the in-room thermostat. The connected hotel system 100 can use an algorithm, e.g., a machine learning algorithm, to determine an optimal time to set the in-room thermostat to a certain temperature value in order to increase the chances that the temperature is at the guest's preferred temperature when the hotel guest returns to his/her room, e.g., through the use of cooling or heating curve calculations.

The instructions sent to the HVAC in-room device are based on an algorithm to dynamically define the thermostat settings in the hotel room that optimize energy consumption whilst targeting the hotel guest's preferred temperature (GPT). The algorithm is based on a state machine including the three hotel guest location states: a first state wherein the hotel guest is detected as being in the hotel room, a second state wherein the hotel guest is detected as being on hotel property, e.g., in the lobby, restaurant or fitness area, but not in the hotel room, and a third state wherein the hotel guest is not detected on the hotel property, e.g., the hotel guest is assumed to have left the hotel.

The algorithm determines a hotel room thermostat set point that is defined based on the current state, i.e., the location of the hotel guest, the values of the guest preferred temperature and the current external temperature (CET), e.g., as measured by the external temperature sensor described above with reference to FIG. 1. In some implementations, the current external temperature may be obtained from a third party provider, e.g., a web service.

In addition, two factors are defined: $F_{onp}$ and $F_{offp}$ where $F_{onp} < F_{offp}$ and both $<=1$. These factors may be empirically defined based on the HVAC in-room device capacity, the size of the hotel room, insulation factors and others. The definition of these factors contribute to the quality perception of the guest. For example, if the factors are too close to 1 this may imply that the hotel guest felt uncomfortable when arriving at the hotel room whilst providing the most possible energy savings. The value of the factors may be learned automatically by observing the current temperature of the room when the guest arrives.

The set point value may be limited to be within a range of temperatures that does not cause harm to anything that is inside the room, and is usually limited by the construction of the thermostat. The table below describes example calculations for set points for each hotel guest location state:

| State | Setpoint formula | Rationale |
| --- | --- | --- |
| In Room | GPT | Temperature is set to guest preferred temperature. |
| On Property | GPT + ((CET − GPT) * $F_{onp}$) | Temperature is set between GPT and CET, closer to GPT to be able to quickly recover if the guest walks in the room. |
| Off Property | GPT + ((CET − GPT) * $F_{offp}$) | Temperature is set between GPT and CET, closer to CET to save energy. |

In some implementations the algorithm may be extended to include additional information about the guest location, e.g., location information within a 10 mile radius of the hotel.

Figure 4:
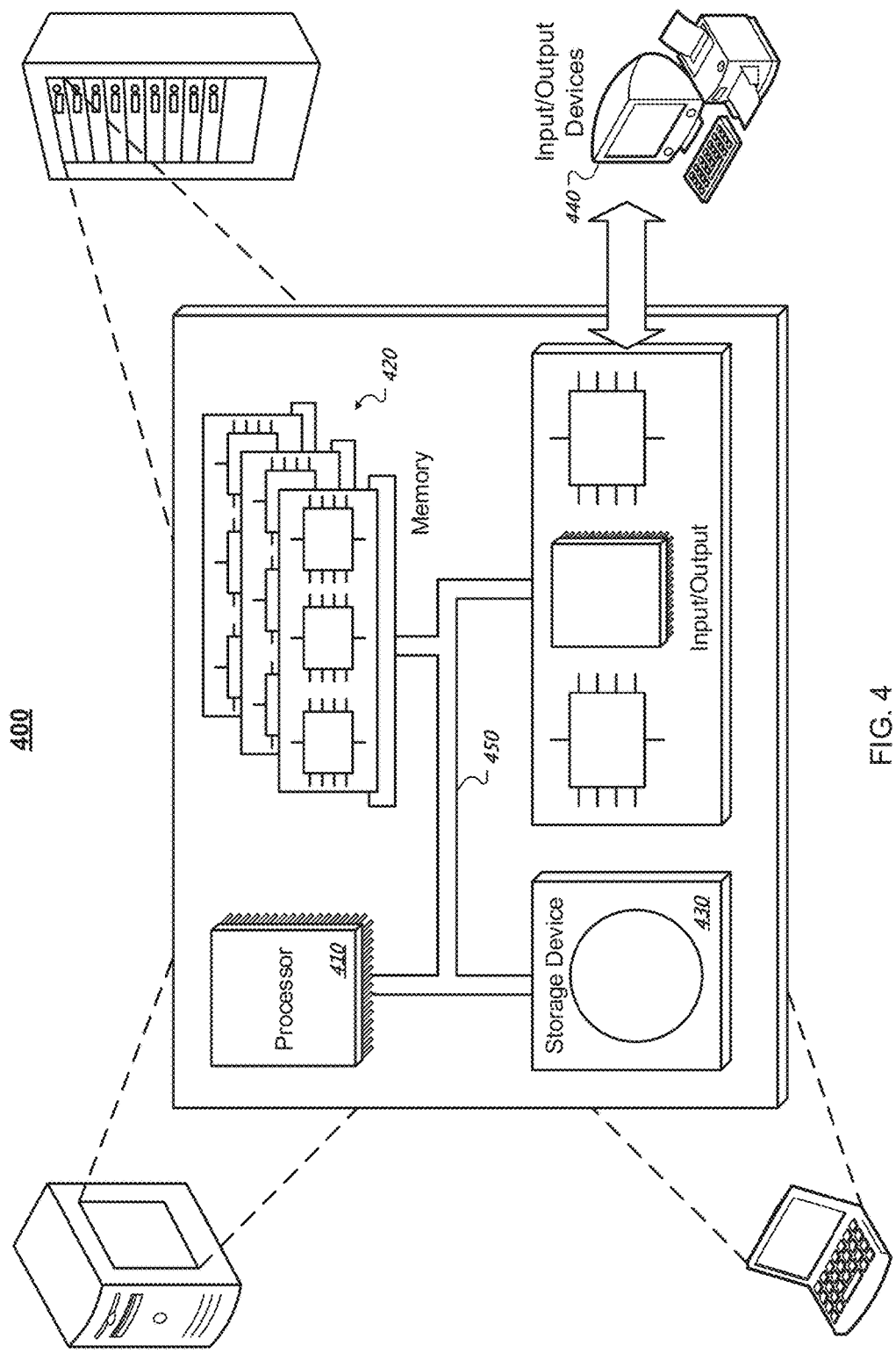
FIG. 4 is a block diagram of a computing system that can be used in connection with computer-implemented methods described in this document.

FIG. 4 illustrates a schematic diagram of an exemplary generic computer system. The system 400 can be used for the operations described in association with the process 300 according to some implementations.

The system 400 includes a processor 410, a memory 420, a storage device 430, and an input/output device 440. Each of the components 410, 420, 430, and 420 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
receiving, by one or more property management servers of a connected hotel system that includes (i) beacons that are each associated with different locations on a hotel premises, (ii) a guest mobile device, (iii) the property management servers, (iv) an external temperature sensor that is configured to output data indicative of a current external temperature value, and (v) in-room thermostats that are each associated with different hotel rooms on the hotel premises, data from the guest mobile device indicating a sequence of the beacons that have been detected by the guest mobile device;
classifying, by the property management servers and using the data indicating the sequence of beacons that have been detected by the guest mobile device, the sequence of beacons as indicative of the user of the guest mobile device likely being in one of two, defined states, including (a) an on-property, non-returning state in which the user is indicated as on-property, moving, and likely remaining on the hotel premises away from their hotel room and not going directly to their hotel room, and (b) an on-property, returning state in which the user is indicated as on-property, moving, and likely going directly to their hotel room; and
based on classifying the sequence of beacons as indicative of the user of the guest mobile device likely being in the one of two, defined states, including (a) the on-property, non-returning state in which the user is indicated as on-property, moving, and likely remaining on the hotel premises away from their hotel room and not going directly to their hotel room, and (b) the on-property, returning state in which the user is indicated as on-property, moving, and likely going directly to their hotel room, setting, by the in-room thermostat that is associated with the hotel room of the user, a temperature setting value for the hotel room to the guest preferred temperature if the user is indicated as likely being in the on-property, returning state, or, if the user is indicated as likely being in the on-property, non-returning state, to a value that (i) is different than the guest preferred temperature value, (ii) is based on the guest preferred temperature value, the current external temperature value, and an empirically derived factor that reflects energy efficiency characteristics of the hotel room of the user, and (iii) is chosen to allow a temperature of the hotel room of the user to reach the guest preferred temperature value when the user later returns to the hotel room.

2. The method of claim 1, wherein classifying the sequence of beacons comprises determining a likely path of the user of the guest mobile device.

3. The method of claim 1, comprising accessing the guest preferred temperature value from a customer profile for the user that is stored in a database associated with the one or more property management servers.

4. The method of claim 1, wherein the sequence of beacons is indicative of the user walking toward a restaurant or spa on the hotel premises.

5. The method of claim 1, wherein the empirically derived factor is determined based on a previous temperature of the hotel room that was observed when the user or other users previously arrived in the hotel room.

6. The method of claim 1, wherein the property management servers classify the sequence of beacons further based on payment information.

7. The method of claim 1, wherein the guest mobile device comprises a wearable device.

8. A computer-readable storage device storing software comprising instructions executable by one or more computers which, upon such execution, cause the one or more computers to perform operations comprising:
receiving, by one or more property management servers of a connected hotel system that includes (i) beacons that are each associated with different locations on a hotel premises, (ii) a guest mobile device, (iii) the property management servers, (iv) an external temperature sensor that is configured to output data indicative of a current external temperature value, and (v) in-room thermostats that are each associated with different hotel rooms on the hotel premises, data from the guest mobile device indicating a sequence of the beacons that have been detected by the guest mobile device;
classifying, by the property management servers and using the data indicating the sequence of beacons that have been detected by the guest mobile device, the sequence of beacons as indicative of the user of the guest mobile device likely being in one of two, defined states, including (a) an on-property, non-returning state in which the user is indicated as on-property, moving, and likely remaining on the hotel premises away from their hotel room and not going directly to their hotel room, and (b) an on-property, returning state in which the user is indicated as on-property, moving, and likely going directly to their hotel room; and
based on classifying the sequence of beacons as indicative of the user of the guest mobile device likely being in the one of two, defined states, including (a) the on-property, non-returning state in which the user is indicated as on-property, moving, and likely remaining on the hotel premises away from their hotel room and not going directly to their hotel room, and (b) the on-property, returning state in which the user is indicated as on-property, moving, and likely going directly to their hotel room, setting, by the in-room thermostat that is associated with the hotel room of the user, a temperature setting value for the hotel room to the guest preferred temperature if the user is indicated as likely being in the on-property, returning state, or, if the user is indicated as likely being in the on-property, non-returning state, to a value that (i) is different than the guest preferred temperature value, (ii) is based on the guest preferred temperature value, the current external temperature value, and an empirically derived factor that reflects energy efficiency characteristics of the hotel room of the user, and (iii) is chosen to allow a temperature of the hotel room of the user to reach the guest preferred temperature value when the user later returns to the hotel room.

9. The device of claim 8, wherein classifying the sequence of beacons comprises determining a likely path of the user of the guest mobile device.

10. The device of claim 8, wherein the operations comprise accessing the guest preferred temperature value from a customer profile for the user that is stored in a database associated with the one or more property management servers.

11. The device of claim 8, wherein the sequence of beacons is indicative of the user walking toward a restaurant or spa on the hotel premises.

12. The device of claim 8, wherein the empirically derived factor is determined based on a previous temperature of the hotel room that was observed when the user or other users previously arrived in the hotel room.

13. The device of claim 8, wherein the property management servers classify the sequence of beacons further based on payment information.

14. The device of claim 8, wherein the guest mobile device comprises a wearable device.

15. A connected hotel system including (i) beacons that are each associated with different locations on a hotel premises, (ii) a guest mobile device, (iii) one or more property management servers, (iv) an external temperature sensor that is configured to output data indicative of a current external temperature value, and (v) in-room thermostats that are each associated with different hotel rooms on the hotel premises, the connected hotel system comprising:
one or more computers and one or more storage devices storing instructions that are operable, when executed by the one or more computers, to cause the one or more computers to perform operations comprising:
receiving, by the property management servers, data from the guest mobile device indicating a sequence of the beacons that have been detected by the guest mobile device;
classifying, by the property management servers and using the data indicating the sequence of beacons that have been detected by the guest mobile device, the sequence of beacons as indicative of the user of the guest mobile device likely being in one of two, defined states, including (a) an on-property, non-returning state in which the user is indicated as on-property, moving, and likely remaining on the hotel premises away from their hotel room and not going directly to their hotel room, and (b) an on-property, returning state in which the user is indicated as on-property, moving, and likely going directly to their hotel room; and
based on classifying the sequence of beacons as indicative of the user of the guest mobile device likely being in the one of two, defined states, including (a) the on-property, non-returning state in which the user is indicated as on-property, moving, and likely remaining on the hotel premises away from their hotel room and not going directly to their hotel room, and (b) the on-property, returning state in which the user is indicated as on-property, moving, and likely going directly to their hotel room, setting, by the in-room thermostat that is associated with the hotel room of the user, a temperature setting value for the hotel room to the guest preferred temperature if the user is indicated as likely being in the on-property, returning state, or, if the user is indicated as likely being in the on-property, non-returning state, to a value that (i) is different than the guest preferred temperature value, (ii) is based on the guest preferred temperature value, the current external temperature value, and an empirically derived factor that reflects energy efficiency characteristics of the hotel room of the user, and (iii) is chosen to allow a temperature of the hotel room of the user to reach the guest preferred temperature value when the user later returns to the hotel room.

16. The system of claim 15, wherein classifying the sequence of beacons comprises determining a likely path of the user of the guest mobile device.

17. The system of claim 15, wherein the operations comprise accessing the guest preferred temperature value from a customer profile for the user that is stored in a database associated with the one or more property management servers.

18. The system of claim 15, wherein the sequence of beacons is indicative of the user walking toward a restaurant or spa on the hotel premises.

19. The system of claim 15, wherein the empirically derived factor is determined based on a previous temperature of the hotel room that was observed when the user or other users previously arrived in the hotel room.

20. The system of claim 15, wherein the property management servers classify the sequence of beacons further based on payment information.

* * * * *